United States Patent [19]

Duwaer

[11] Patent Number: 4,922,240

[45] Date of Patent: May 1, 1990

[54] THIN FILM ACTIVE MATRIX AND ADDRESSING CIRCUITRY THEREFOR

[75] Inventor: Arne L. Duwaer, Ossining, N.Y.

[73] Assignee: North American Philips Corp., New York, N.Y.

[21] Appl. No.: 139,872

[22] Filed: Dec. 29, 1987

[51] Int. Cl.$^5$ .............................................. G09G 3/36
[52] U.S. Cl. .................................. 340/784; 340/719; 350/333
[58] Field of Search .............. 340/784, 718, 719, 765, 340/783; 358/230, 236, 240, 241; 350/332, 333

[56] References Cited

U.S. PATENT DOCUMENTS

| 3,862,360 | 1/1975 | Dill et al. | 340/719 |
| 4,582,395 | 4/1986 | Morozumi et al. | 340/784 |
| 4,724,433 | 2/1988 | Inoue et al. | 340/784 |
| 4,789,857 | 12/1988 | Maurice | 340/784 |

FOREIGN PATENT DOCUMENTS 2070857  9/1981  United Kingdom ................ 340/784

OTHER PUBLICATIONS

"Liquid Crystal Matrix Displays", Lechner et al., Proceedings of the IEEE, Nov., 1981, pp. 1566-1579.
"LCD Addressed by a-Si TFTs Employing Redundancy Technology", Takeda et al.; Japan Display '86, pp. 204-207.
"A New Overhead Projection System Using a Defectless 640×400 Pixel Active-Matrix LCD ...", Takehashi et al., SID 87 Digest, pp. 79-81.
"The 5-Inch Size Full Color Liquid Crystal Television Addressed by Amorphous Silicon Thin Film Transistors", Yamano et al., IEEE Transactions on Consumer Electronics, Feb., 1985, pp. 39-43.
"Active Matrix Liquid-Crystal Display with Integrated Scanner Electronics", Malmberg et al., SID 86 Digest, pp. 281-284.

Primary Examiner—Jeffery A. Brier
Attorney, Agent, or Firm—Emmanuel J. Lobato; Marianne R. Rich

[57] ABSTRACT

In a matrix display device, such as an LCD-TV, supply of data signals to each one of an array of display elements is controlled by respective switching means in response to applied switching signals. Novel addressing circuitry is provided to achieve redundancy and avoid improper charge levels on non-selected switching means.

19 Claims, 13 Drawing Sheets

ACQUISITION "I", SAMPLE "I" → "0", HOLD "0"

THIN FILM ACTIVE MATRIX AND ADDRESSING CIRCUITRY THEREFOR

FIELD OF THE INVENTION

This invention relates to a film active matrix device and addressing circuitry for the device. In particular, it relates to a matrix that can be used as a display device.

BACKGROUND OF THE INVENTION

Film active matrix devices can be used for many purposes. One of the more common applications is as a display device. In this application, the device comprises a plurality of display elements arranged in an array formed by electrodes supported on opposing sides of a thin layer or film of electro-optical material and associated with switching means operable to control the application of data signals to the display elements in response to switching signals applied to the electrodes. A display device of this kind is suitable for displaying alphanumeric and video information using for the electro-optical layer materials like liquid crystal and electrophoretic suspensions. See, for example, the article by Lechner et al, PIEEE, November, 1981, pgs. 1566–1579, the contents of which are hereby incorporated by reference.

In known examples of this kind of liquid crystal matrix display device, the display elements are arranged in a matrix of rows and columns which are defined by respective pixel electrodes on one side of the active layer and opposing portions of a common electrode on the opposite side of the active layer. Switching means in the form of a transistor, for example a thin film transistor (TFT), is located adjacent the pixel electrode of its respective display element with its drain electrode connected to the pixel electrode. The source electrodes of all transistors in the same column are connected to a respective one of a set of column conductors to which data signals are applied, and the gate electrodes of all transistors in the same row are connected to a respective one of a set of row conductors to which switching (gating) signals are applied to switch the transistors on. The device is driven by repetitively scanning the row conductors one at a time in sequential fashion so as to turn on all transistors in each row in turn, while applying data signals to the column conductors appropriately in synchronism for each row in turn so as to build up a display. When the transistors are on, the data signals are supplied to the associated driving electrodes thus charging up the display elements. Each display element (LCD) or pixel as it is commonly called can be thought of as electrically equivalent to a capacitor. When the transistors are turned off, upon termination of the switching voltage, the charge is stored in the display elements concerned until the next time they are addressed with a scanning signal, in the case of a video display with non-interlaced scanning, in the next field period.

Display devices of this type are generally well known. Such an active matrix addressed liquid crystal display device may typically consist of 200,000 or more display elements and be capable of displaying TV pictures. The resolution of the displayed image depends upon the number of pixels forming the image. The trend has been to increase the number of pixels to, for example, a 480×640 matrix (total of 307,200 pixels) to achieve the resolution of a normal TV receiver. For large area display devices, the transistors used to drive the pixels are usually thin-film transistors (TFTs) deposited on a transparent substrate (glass or quartz). With the increasingly larger display areas now being proposed comes a corresponding increase in the number of display elements, and hence switching means, required.

A major problem in making such high resolution display devices is the number of connections required between the addressing circuitry and the TFT drivers for the pixels. Suppose, for example, that the active matrix is a 3 cm×4 cm rectangle, typical for projection television (PTV) applications. A matrix employing 480 rows and 640 columns would thus require 1120 connections to the addressing circuitry. The current state of the art does not allow so many connection points to be provided around the periphery of a 3×4 $cm^2$ rectangular matrix without increasing the substrate area required per matrix, and thus the cost, significantly.

Another major problem in making large area display devices of this kind is yield. When using, for example, TFTs deposited on a transparent substrate with their associated row and column conductors, just a few defective pixel TFTs or one conductor break will render the device unacceptable. Depending on the nature of the defect, even one defective TFT can lead to one complete row and one complete column of display elements being unusable. In an attempt to overcome this problem, various redundancy schemes have been proposed. Takeda et al, Japan Displays '86, pps. 204–207, provides one additional TFT per pixel, so a total of two TFTs per pixel, with the TFTs controlled or driven by adjacent scanning lines. No additional gate or source lines are necessary. In a variation, three TFTs per pixel is described, the third TFT in this case interconnecting vertically adjacent pixels.

Takahashi et al, SID 87 Digest, pps. 79–81, focuses on line defects and proposes duplicate data input routes per line. In other words, each pixel is connected to two row conductors by way of a separate TFT, with each conductor driven from opposite sides. Duplicate or redundant lines are also described in Yamano et al, IEEE-TCE, Feb. 1985, pps. 39–43, though it is not clear whether extra TFTs for each pixel are provided.

In the redundancy schemes proposed so far to correct for line defects, duplicate or redundant lines have been provided, in some cases requiring additional TFTs per pixel to couple the redundant lines to each pixel. Also, driving of the conductive lines with the same signals from opposite sides of the matrix has been proposed.

As mentioned earlier, another problem is the large number of connections required between the active LCD display and the addressing circuitry. This is a difficult requirement to satisfy especially for projection systems, where the active LCD display leaves, for cost reasons, only a small narrow border region to accommodate the large number of required connections. Malmberg et al, SID 86 Digest, pps. 281–284, proposes to integrate the scanner electronics on the display substrate using the same technology used in the manufacture of the pixel drivers for the LCD elements, and further proposes to reduce the number of connections using a commutator or switch configuration based on the same matrix configuration used in the active display to select individual pixels. In the Malmberg proposal, the row lines are divided up into 16 sections of 8 lines each (for a 192×128 matrix). Operation for use as a TV display is not described, and external ICs are required to provide the data and select signals as shown in FIG. 7 of this publication.

This prior art proposal fails to recognize that the OFF-state for all non-selected row lines can and should be defined every TV line time, thereby eliminating the possibility that the row capacitors of non-selected rows will gradually build up during the frame time sufficient charge to allow the inputted information, video for a TV display, to be displayed at more than one line at a time. Another disadvantage is that the proposed switch configuration for the commutator makes it impossible (for the columns) or more difficult (for the rows) to incorporate efficient redundancy schemes.

BRIEF SUMMARY OF INVENTION

An object of the invention is an improved thin-film active matrix device for TV displays.

A further object is to increase the degree of integration of the required addressing circuitry for a film active matrix device.

Still another object is to provide a novel redundancy scheme that will protect against inadvertent line breaks.

A further object is to provide a thin-film active matrix device which avoids spurious display of video information.

These and other objects and advantages as will appear hereinafter are achieved in my novel film active matrix device by incorporating therein one or more of the following features.

One feature of my invention provides redundancy to correct for line defects and requires no additional row or column lines, and only one additional TFT for each row or column. Thus, a considerable saving in space requirements and complexity is achieved with only a modest increase in the additional number of components required. This feature encompasses interconnecting the inputs of two TFTs, and connecting the outputs to respective adjacent row or column lines from one side of the matrix and doing the same thing on the opposite side with the next two adjacent row or column lines.

Another feature of the invention is an addressing scheme using a matrix configuration in which the address drivers are oriented in each section of neighboring driver TFTs, such that all sources (instead of all gates) are interconnected. This arrangement, surprisingly, allows the incorporation into the panel of the novel redundancy scheme described above, which is not possible in the Malmberg arrangement.

As another feature of the invention, novel circuitry is provided to accurately define the OFF-state of each non-selected line during a fraction of each TV line time. This is achieved by circuitry which includes application of a positive OFF-state to all row lines, and achieves the selection of one row line, or two row lines when my novel redundancy scheme is used, by combinational logic which includes the horizontal and vertical flyback pulse in the selection process.

Still a further feature of the invention is the integration of the selection circuitry on the substrate, in addition to the addressing circuitry, which eliminates the need for some external ICs and results in a further reduction of necessary connections to the substrate thereby increasing the potential yield in the fabrication of such display devices for TV applications.

Another feature of the invention is an improved driving circuit for the columns which provides an increased acquisition time for the pre-processed video signal without requiring the addition of more memory.

The active transistors, which include the pixel transistors, the address and selection drivers, are formed as TFTs, typically on a transparent substrate such as glass, using, for example, amorphous silicon or polysilicon technology. While II-VI compound semiconductors can also be used, I prefer polysilicon TFTs because in the smaller sizes required for projection TV applications, they exhibit a higher mobility and a lower photosensitivity.

BRIEF DESCRIPTION OF THE DRAWINGS

Embodiments of an active matrix device in accordance with the invention will now be described, by way of example, with reference to the accompanying drawings, in which.

DETAILED DESCRIPTION OF THE PREFERRED EMBODIMENTS

In accordance with one feature of the invention, the addressing circuitry is built up with a row/column matrix structure, with each row of a first addressing matrix connected to a respective row of the active pixel matrix, and with each column of a second addressing matrix connected to a respective column of the active pixel matrix. This concept effectively reduces the total number of connection points for a 480×640 active matrix for TV from 1120 connections to approximately a value one order of magnitude lower. The resultant smaller number of connection points can be provided on the common substrate using state-of-the-art technology. Further reductions in the number of connection points are possible by using thin-film circuitry to realize the control signals for the addressing matrices.

Figure 1:
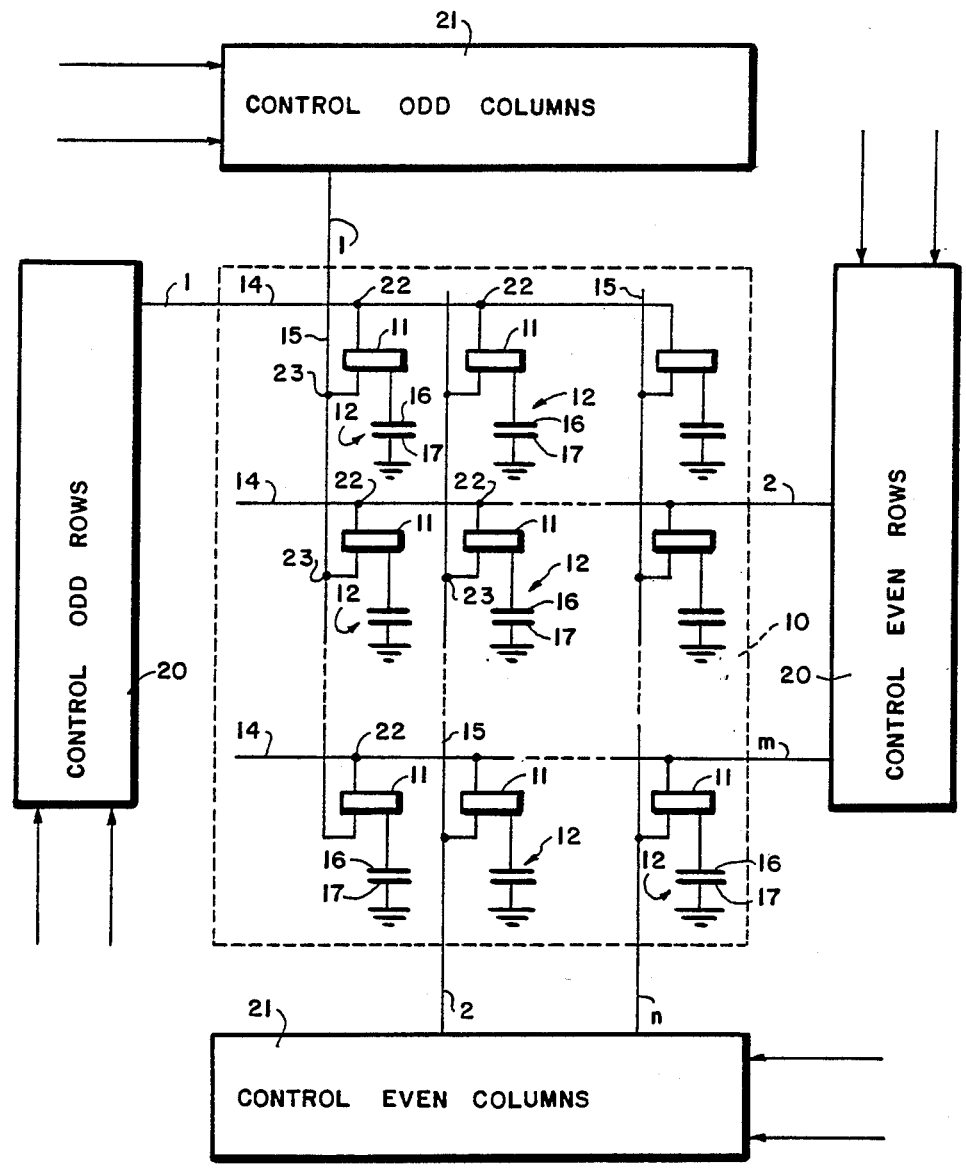
FIG. 1 shows schematically in simplified block form a conventional liquid crystal matrix display device employing a column and row array of display elements each of which is associated with respective switching means.

Referring to FIG. 1, a matrix display device of the type described in the Lechner et al publication and which is suitable for displaying TV pictures comprises an active matrix addressed liquid crystal display panel 10 which consist of m rows (1 to m) with n horizontally arranged display elements 12 (1 to n) in each row. Only a few of the display elements are shown for simplicity. In practice, the total number of display elements (m×n) in the matrix array may be 200,000 or more, for example 307,200 display elements or pixels for a 480×640 matrix.

Each display element 12 has associated therewith a switching means 11 which serves to control the application of data signal voltages to the display element. The switching means 11 associated with all display elements 12 in a respective row are controlled via a common row conductor 14 which is supplied with a switching signal and to which the switching means are connected at points 22. The switching means 11 associated with all display elements 12 in a respective column are connected at points 23 to a common column conductor 15 to which data signal voltages for the display elements concerned are supplied. Thus there are m row conductors 14 and n column conductors 15, the two sets of conductors extending at right angles to one another.

Outputs from the switching means 11 are connected to an electrode 16 of their respective display elements carried on a surface of a substrate of the device together with the conductors 14 and 15 and the switching means 11. A counter electrode 17 common to all display elements is carried on another surface of the substrate or on another substrate parallel to, and spaced from, this one substrate surface with, for example, TN liquid crystal material disposed therebetween. The one or the opposing substrates, which may be of glass, are provided with polarizer and analyzer layers in conventional manner. The liquid crystal material modulates light transmitted as by projection through the display elements according to the voltage applied thereacross, with each display element, defined by a respective electrode associated with a switching means on one substrate, an opposing portion of the common electrode on the other substrate and liquid crystal material therebetween, being operable to vary light transmission through the thus-produced panel in accordance with a drive voltage applied across its respective electrodes. The device is driven on a row at a time basis by scanning the row conductors 14 sequentially with a switching signal so as to turn on all the switching means in each row in turn and applying data signals to the column conductors for each row of display elements in turn as appropriate and in synchronism with the switching signals so as to build up a complete display picture. In the case of a TV display, these data signals comprise video information signals with each row of display elements being provided with video information signals corresponding to a TV line. Using one row at a time addressing, each switching means 11 of the addressed row is switched on for a time of, for example, TL, the active line time, during which the video information signals are transferred from the column conductors 15 to the display elements 12. Following row addressing and the termination of the switching signal, the switching means 11 of the row turn off, thereby isolating the display elements from the conductors 15 and ensuring that the applied charge is stored on the display elements. The display elements stay in the state into which they were driven, determined by the applied data signal, until the next time the switching means are addressed, in case of non-interlaced scanning in the next field period.

This implies that the data storage time is usually equal to the field time.

The row conductors are addressed with switching signals by a control circuit 20 supplied with regular timing pulses. Video information (data) signals are supplied to the column conductors 15 from a control circuit 21. The circuit 21 is supplied with video signals and timing pulses in synchronism with row scanning and provides serial to parallel conversion appropriate to the row at a time addressing of the panel 10. Odd and even rows, and odd and even columns, are usually driven from opposite sides of the panel in order to reduce the number of connections from the control circuitry 20, 21 to the display 10 per millimeter.

One aspect of the invention is to build the addressing circuitry of blocks 20 and 21 using the same TFT technology used to make the TFT pixel drivers 11 for the LCD matrix. See the publications cited earlier for descriptions of such technology. In this aspect of the invention, the TFT technology is extended to the borders of the panel, outside of the active display area, and is used to simultaneously construct the addressing circuitry of blocks 20 and 21. Moreover, a row/column matrix scheme is used in the addressing circuitry that is similar to the row/column matrix scheme of the panel in order to reduce the number of connections to a level that can be conveniently made on these small area matrix arrays without adding additional processing steps. This is illustrated in FIG. 2, which also shows, schematically, that the addressing matrices 20, 21 can be uniformly distributed on the substrate around the periphery of the display array 10 in a manner that will not require excessive real estate or substrate area, yet will achieve the desired objective of minimizing the number of required connections.

Figure 2:
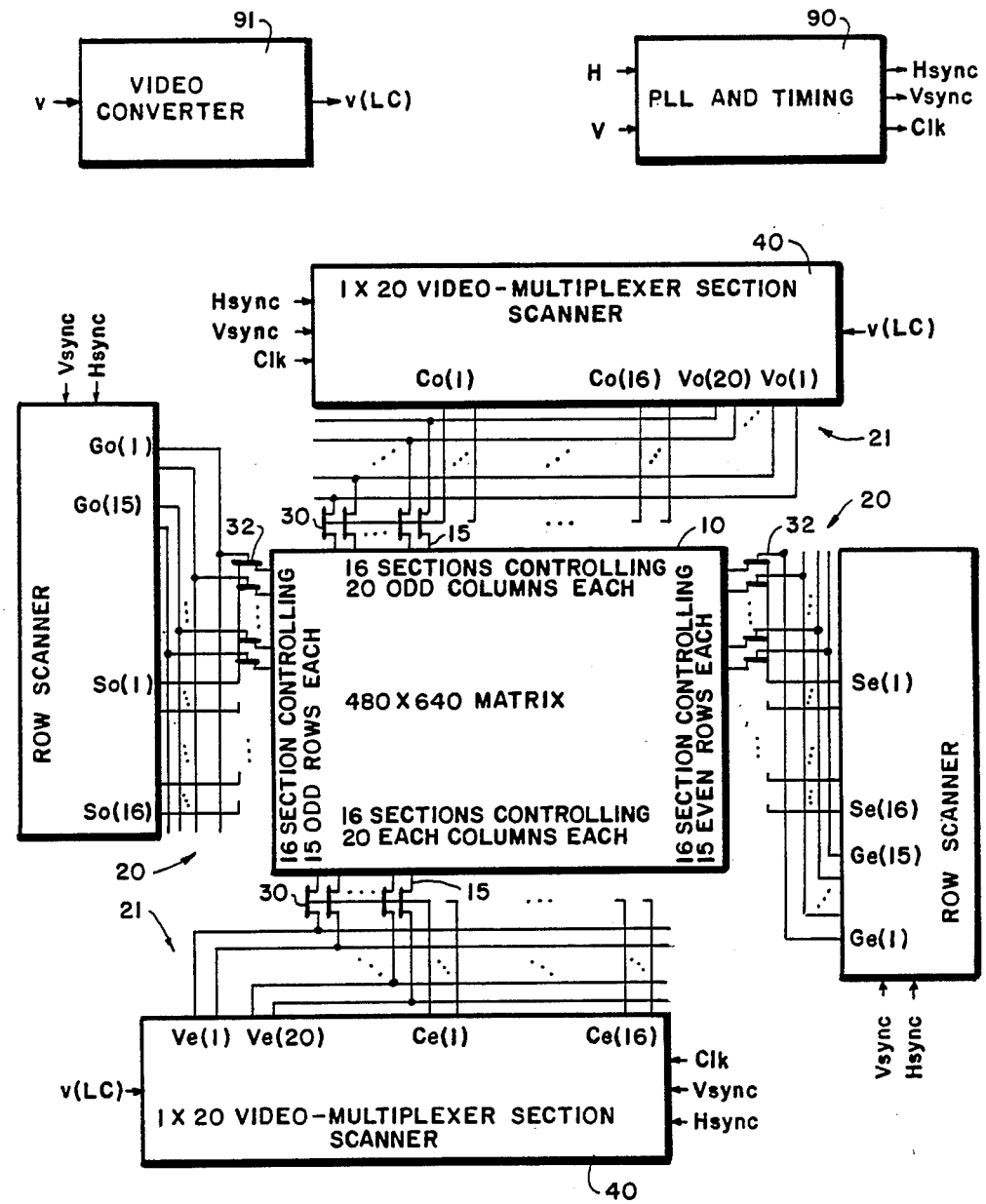
FIG. 2 shows diagrammatically a schematic illustrating double matrix addressing for a device of the type illustrated in FIG. 1 wherein the row and column addressing circuitry is divided up into multiple sections.
Figure 3A:
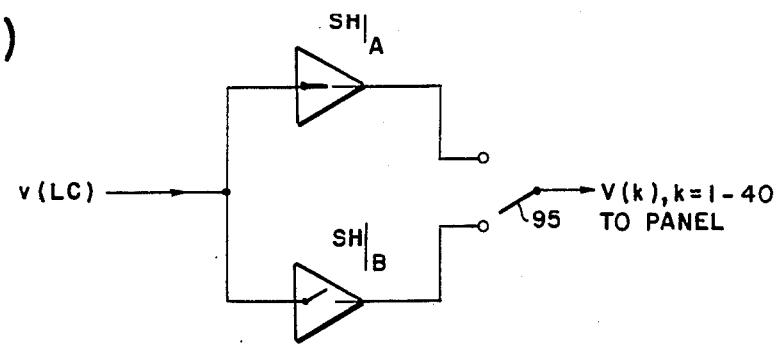
FIGS. 3(a), 3(b) and 3(c) are schematics showing video preprocessors and their logical timing diagrams for column loading for a device of the type illustrated in FIG. 2.
Figure 3A:
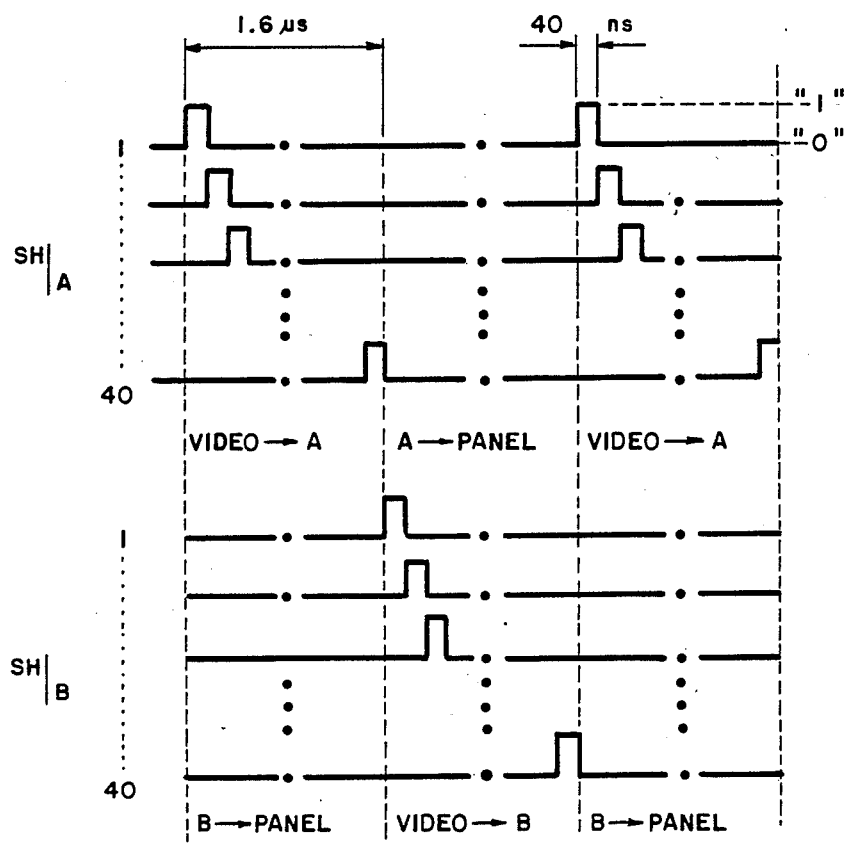
Figure 3B:
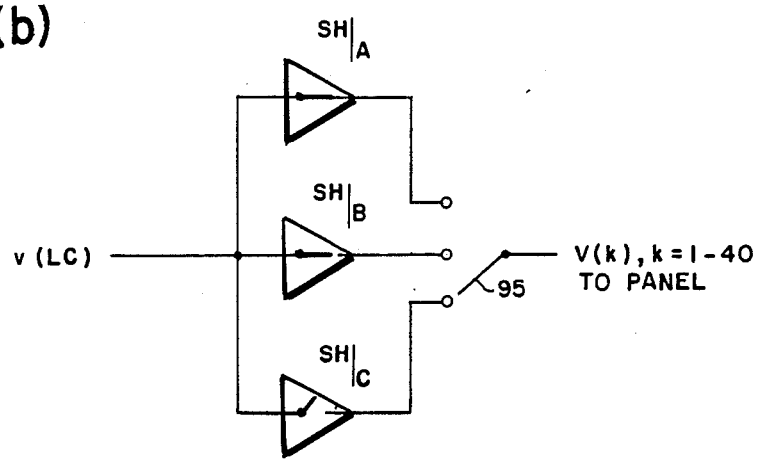
Figure 3B:
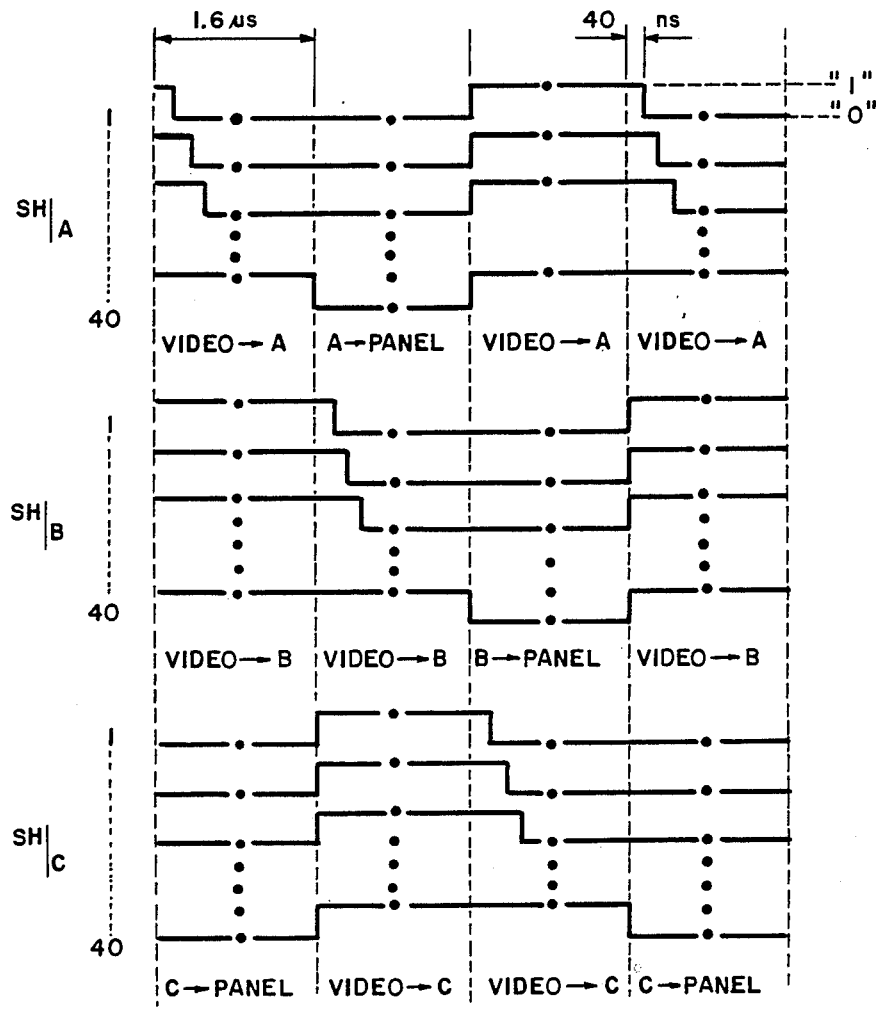
Figure 3C:
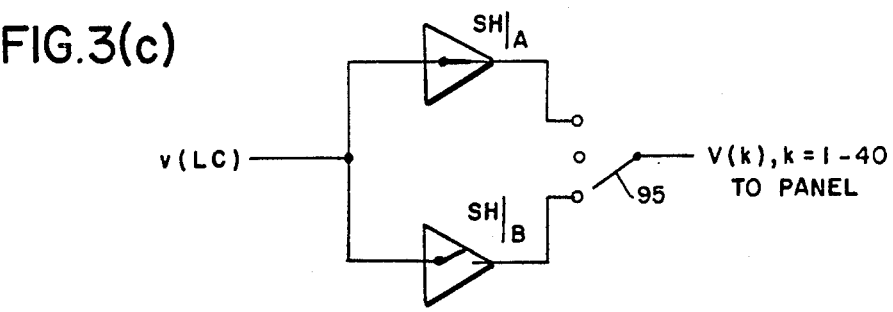
Figure 3C:
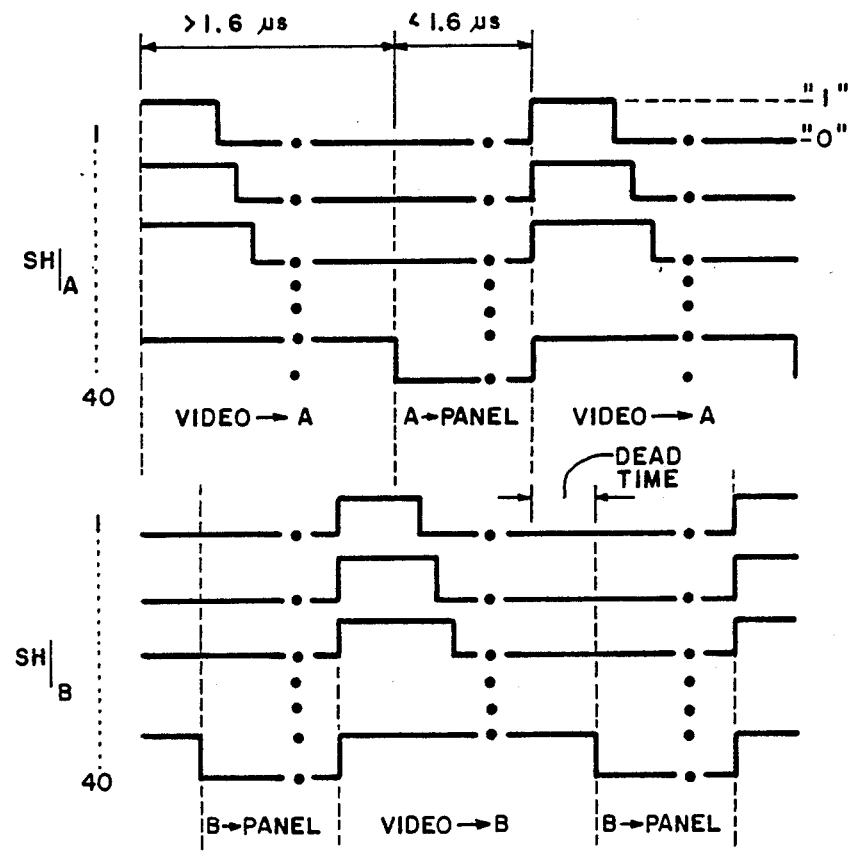

FIG. 2 shows the active (LCD) matrix 10 using double-matrix addressing. I also prefer an addressing scheme in which both odd and even columns and odd and even rows are driven from opposite sides of the active matrix. In the examples to be given, a 480×640 active matrix will be used, but it will be understood that the invention is not limited thereto. The 320 odd columns in FIG. 2 are addressed from above, and the 320 even columns are addressed from below. Similarly, the 240 odd rows are addressed from the left and the 240 even rows from the right. The odd and even columns are both driven by (16×20) addressing matrices with 16 sections each controlling 20 columns. This thus requires 20 common column input signal lines for each side, labelled $V_o(1) \ldots V_o(20)$ and $V_e(1) \ldots V_e(20)$, V meaning the video signal inputs, the subscript "o" odd and the subscript "e" even. Each column input signal line is connected to one corresponding column of each section. In operation, the original incoming video signal has to be converted to a signal v(LC) suitable to drive the liquid crystal panel. The converted video signal is divided up into the 40 appropriate signals which when applied to the column input signal lines $V_o(1) \ldots V_o(20)$ and $V_e(1) \ldots V_e(20)$, will give the correct column signals at 15. This is accomplished with a known preprocessor 40, e.g. with two 1×20 video-multiplexers as off-substrate ICs. This preprocessor can be as simple as two 40-cell analog memories like known sample and hold circuits, with appropriate read/write facilities as illustrated in FIG. 3(a). The normal TV line signal v(LC) is acquired and sampled over 40 successive intervals and the results stored in a 40-cell memory $SH|_B$. In the example, this takes $40 \times 40$ ns = 1.6 $\mu$s. While the next 40 intervals are acquired, sampled and stored in the other 40-cell memory $SH|_A$, the contents of $SH|_B$ is connected by switch 95 to the $V_o(1) \ldots V_o(20)$ and $V_e(1) \ldots V_e(20)$ lines. In FIGS. 3(a), 3(b) and 3(c), the legend video→A signifies the acquisition time of a known sample/hold circuit, the legend A→panel indicates the time during which the sampled signal is supplied to the LCD panel, A and B representing the sample/hold circuitry. A preprocessor with two 40-cell memories requires cells with a small signal-acquisition time (40 ns for progressive scanning), as illustrated in FIG. 3(a). This can be circumvented by using, as illustrated in FIG. 3(b), three 40-cell memories, with each 40-cell memory going through an acquisition mode, an acquisition/sample/hold mode, and a hold mode, with the modes of the three 40-cell memories being always different. Another more efficient circuit is illustrated in FIG. 3(c) without the need of additional memory. As will be observed in the logical timing diagrams for the FIG. 3(c) embodiment, the acquisition time of the sample and hold mode has been increased by decreasing the time that the sample and hold is connected to the panel. By this novel approach, the problem is simplified of providing sufficiently fast, cost-effective, off-substrate ICs to perform the necessary video multiplexing. As will be noted, the acquisition time for each sample and hold has been significantly increased with only a small reduction in the time available to pass the signals to the panel. In the illustrative example, reducing the signal to panel connection time from, say, 1.6 μs to 1.4 μs results in an acquisition time increase for $SH|_A(1)$ and $SH|_B(1)$ by a factor of about 6 (from 40 nS to 240 nS). A small penalty that results is a certain dead time, as illustrated, in which no signals are being transferred to the panel when switch 95 is at the unconnected terminal, in contrast to the embodiments of FIGS. 3(a) and 3(b). The circuitry needed to implement this embodiment is straightforward, cost-effective and well within the skill of the artisan. If the preprocessor also contains two digital line stores with at least 640 cells each to realize the preferred non-interlaced scanning, any desired pattern of video signals can be simultaneously outputted by appropriate addressing of the line storage cells to the column selector lines via the two or three 40-cell analog, or digital, memories.

The video signals that are outputted from the preprocessor onto the column selector lines $V_o(1) \ldots V_o(20)$ and $V_e(1) \ldots V_e(20)$ are chosen depending upon the addressing circuitry. In the instance illustrated in FIG. 2, the active line time TL/number of columns n×number of incoming video signals (for a progressive scan TV signal, 26 μS/ 640 columns×40≅1.6 μS.) determines the maximum time interval each set of signals for a section sits on the column selector lines. With the circuitry illustrated where each line V is connected to the column lines by way of a column driver 30 whose gates for each section are interconnected and terminate at a control input $C_o(1) \ldots C_o(16)$ and $C_e(1) \ldots C_e(16)$, then the signal sequence is as follows. At $T_1$, the first 40 video signals appear on lines V, $C_o(1)$ and $C_e(1)$ are turned ON, $C_o(2) \ldots C_o(16)$ and $C_e(2) \ldots C_e(16)$ remain OFF for 1.6 μS, and the video signals are passed into the matrix. At time $T_2$, the next 40 video signals appear on lines V, $C_o(2)$ and $C_e(2)$ are turned ON (the remaining control lines remain off), and the next set of signals are passed on to the matrix. At the end of 26 μS, one line of the matrix can be activated. In this arrangement, columns 1 . . . 40 are assigned to section 1, column 41 . . . 80 to section 2, and so on.

Figure 9:
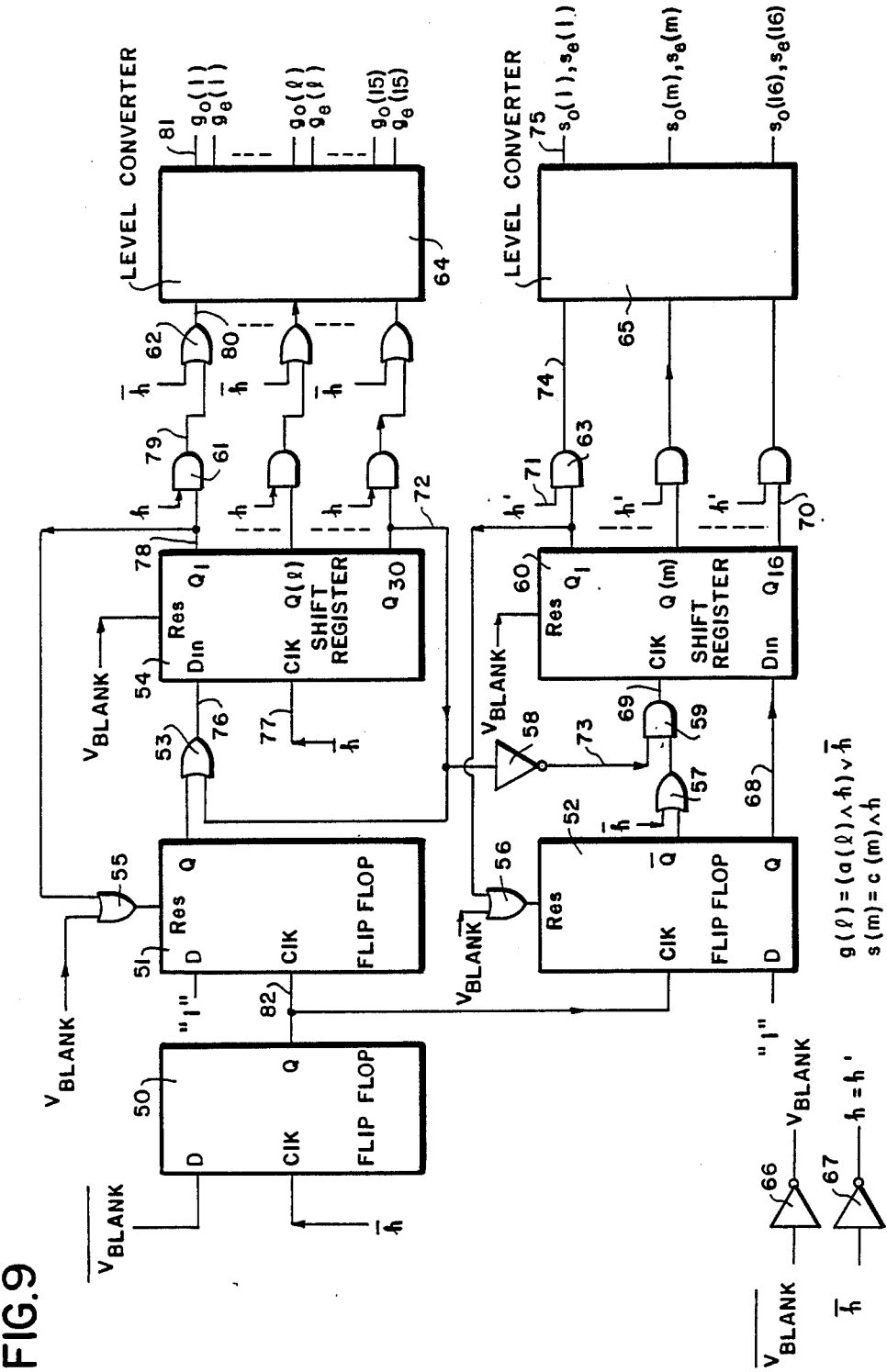
FIG. 9 is a schematic of one form of logic circuit for use in row addressing in accordance with the invention.

The "travelling-one" signal needed for $C_o(1) \ldots C_o(16)$ and $C_e(1) \ldots C_e(16)$ when the video-multiplexers shown in FIGS. 3(a) and 3(b) are used is depicted in FIG. 9 (later explained more fully). In the present case the pulse duration is 1.6 μs and the pulse train starts at the beginning of the active line. These signals can be generated with a section scanner consisting of a 16 bit shift register that is started by the positive-going transition of h, and that is clocked at intervals of 1.6 μs. For the video-multiplexer given in FIG. 3(c), the $C_o(1) \ldots C_o(16)$ and $C_e(1) \ldots C_e(16)$ signals have to be gated during the intervals that no proper video signals are available (during the dead times). To reduce the number of connections to the substrate even further, this section scanner could be integrated on the substrate using the same thin-film technology. This will be discussed in more detail when the circuitry needed for the row drivers is described.

The actual application of the video signals to the pixels can be done in one of two ways: by first loading the line of signals into intermediate column capacitors during the 26 μS, and then loading the pixel-capacitors with the charge on the column capacitors during the 6 μS horizontal flyback interval Tf, which means the row is selected during this 6 μS interval, or having the signals pass directly into the pixels during the 26 μS TL, which means the row is selected during the latter interval. Both are within the scope of my invention, though I tend to prefer the two step process of first loading intermediate capacitors during active line time and then loading the pixels during flyback because it reduces the speed requirements for the 307,200 pixel TFTs.

A phase lock loop 90 (see FIG. 2) generates a clock signal with a period, in this case, of 40 ns that is locked to the horizontal and vertical synchronization pulses H and V of the incoming video signal. Appropriate timing circuitry 90 also derives $H_{sync}$ and $V_{sync}$ pulses from the clock (clk) signal.

The addressing matrix arrangement for the rows is similar, the m=480 rows being divided, for example, into 16 sections of 15 rows, each fed from opposite matrix sides. In this case, corresponding rows in each section are connected to the row driver lines indicated by $S_o(1) \ldots S_o(15)$ and $S_e(1) \ldots S_e(15)$ by way of individual transistors 32, whose gates within a section are commonly connected to control lines $G_o(1) \ldots G_o(16)$ and $G_e(1) \ldots G_e(16)$. Row 1 is selected by turning ON $G_o(1)$ and $S_o(1)$, row 2 by turning on $G_e(1)$ and $S_e(1)$, row 31 by turning on $G_o(2)$ and $S_o(1)$, and so on, for progressive scanning, which is preferred; if interlaced scanning is desired, then of course a frame of the odd rows can be first activated followed by a frame of the even rows.

As will be noted, the total number of connections between addressing circuitry 20,21 and the display matrix 10 has been reduced to 134. Moreover, since the matrix 20,21 arrangement is similar to the active matrix 10, it is readily integrated onto the substrate, by the same technology used to make the row and column conductors 14,15 and TFT switches 11.

This number 134 is at or close to the theoretical minimum number of connections between an m×n display matrix and K+1 addressing matrices. These minimum values, which is K+, are: $2\sqrt{m}$ for one-sided addressing of odd and even numbered row conductors; $2\sqrt{m}/2$ for two-sided addressing of odd and even row conductors; $2\sqrt{n}$ for one-sided addressing of odd and even numbered column conductors; and $2\sqrt{n}/2$ for two-sided addressing of odd and even column conductors. In the illustrative case, which is not to be deemed limiting in any way, m=480; n=640, $k_{rows}$=16, $L_{rows}$=15, $k_{columns}$=16, $L_{columns}$=20, and for the two-sided addressing shown, k+1 per side of the rows=31 and k+1 per side for the columns=36. The respective minimum values for two-sided addressing are for the rows 31 and for the columns 36. Thus, the total number of connections required for this instance is $k_{total}$+$L_{total}$=2×31+2×26=134, the above-mentioned number.

What is necessary for one column addressing mode and for the row addressing scheme is the ability to store voltage values (charge) over some interval. Each of the row and column lines have associated therewith a natural or parasitic capacitance that can be used for this purpose. If it proves insufficient, an additional capacitor is easily added by thin film technology to be connected between each driver transistor 30,32 and the matrix 10, and ground.

I prefer a different orientation of the driver transistors in which, instead of the gates, their sources are commonly connected for each section of neighboring driver transistors, as this lends itself to incorporation of a novel redundancy scheme to increase yield.

Figure 4:
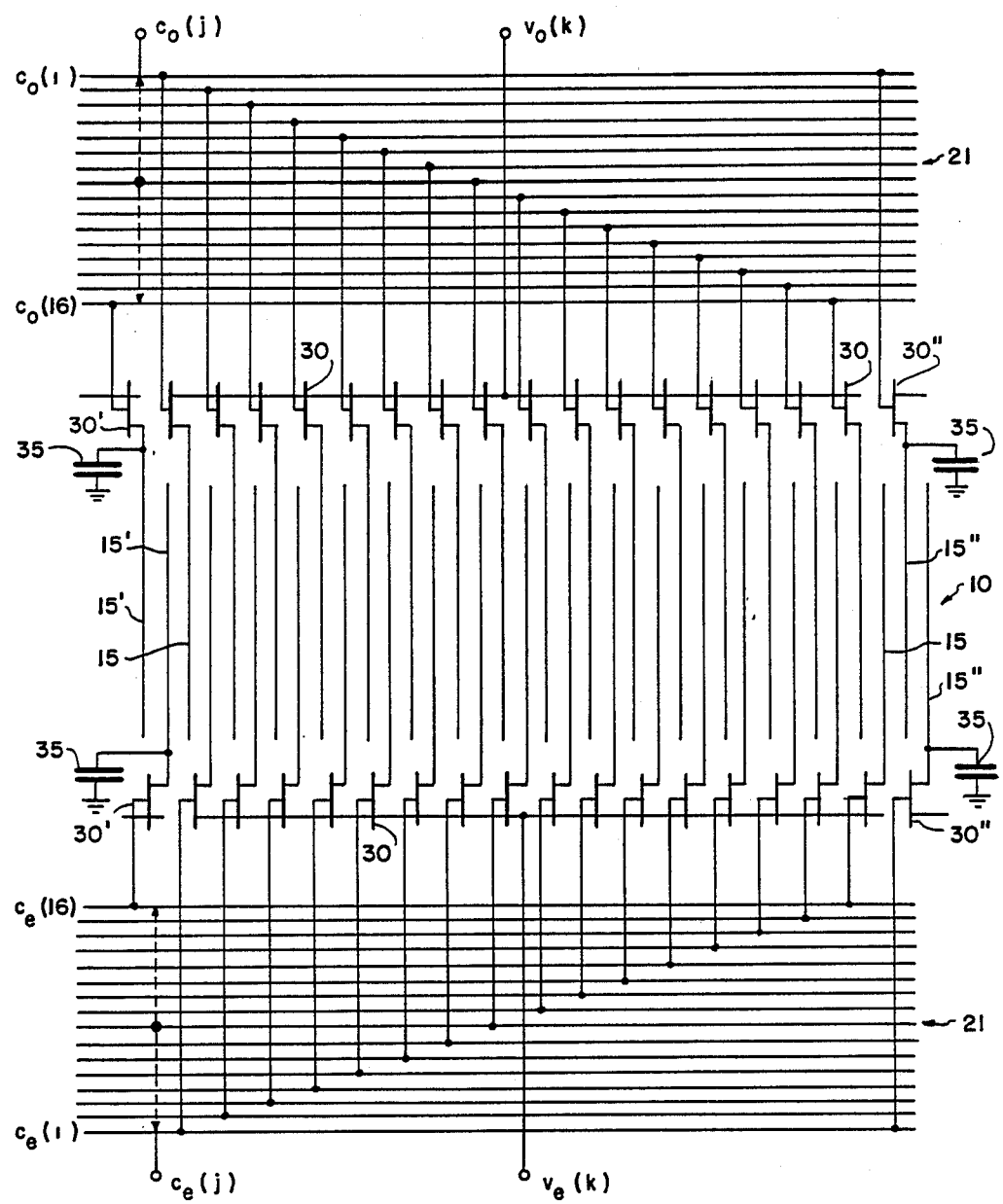
FIG. 4 is a schematic showing one form of column addressing in accordance with the invention.

A schematic of the latter, but without redundancy, is illustrated in FIG. 4 in which the row-lines are not drawn. This figure shows 16 column selector lines C(1) . . . C(16) at opposite sides, in the center the alternate arrangement of column lines 15 for two corresponding sections, at the left two columns lines 15' from the previous corresponding sections, and at the right two columns lines 15" from the next corresponding sections. In this instance, each of the column selector lines is connected to corresponding gates of column driver transistors 30, the drains of which are connected to their respective column lines 15. The source electrodes of all the transistors 30 for one section are interconnected for the top group to a common terminal labelled $V_o(k)$, and for the bottom group to a common terminal labelled $V_e(k)$, where k varies from 1 . . 20. In the adjacent sections, the selector lines are connected to the gates of the corresponding column driver transistors 30' and 30". For this system to operate properly, for the redundancy scheme described below, the signals appearing on the upper and lower horizontal lines are sequential control pulses for 0.8 μS each which turns on one transistor 30,30',30" in each section. So assuming the two sections fully illustrated are the third and fourth sections, including column lines 33 . . . 64, the two sections on the left cover column lines 1 . . . 32, and the two sections on the right column lines 65 . . . 96, etc; then when $C_o(1)$ is ON (all the remaining $C_o(2)$ . . . $C_o(16)$ and $C_e(1)$ . . . $C_e(16)$ being OFF), the column drivers for lines 1, 33, 65 . . . are activated. Now the video signal introduced at $V_o(k)$ for the second section must be the 33rd sample, and for $V_o(k+1)$ at the next section on the right must be the 65the sample, and so on. This is easily obtained by suitable programming of the preprocessor. On the next 0.8 μS, $C_e(1)$ is ON (all the remaining $C_o(1)$ . . . $C_o(16)$ and $C_e(2)$ . . . $C_e(16)$ being OFF), the video on the set of video lines $V_e(k)$ simultaneously applied must contain the 2nd, 34th, and 66th samples, etc. Otherwise, the operation is the same as for FIG. 2. In FIG. 4, I have illustrated the supplemental and/or parasitic capacitors 35 associated with each column line, though only a few are shown.

An aspect of the present invention is a redundancy scheme to increase the yield of devices manufactured which may contain breaks or interruptions in the row or column electrodes of the active matrix. This is accomplished by addressing each active row or column from opposite ends with circuitry which applies the data signals for each row or column also to an adjacent row or column. Should a row or column conductor be interrupted due to a processing defect, each remaining row or column part conductor of the broken line will nevertheless receive either the correct data for that row or column, or the data for the previous row or column, which usually differs by only a small amount from the correct data and the resulting artifact will thus be barely perceptible, if at all, by an observer.

Figure 5:
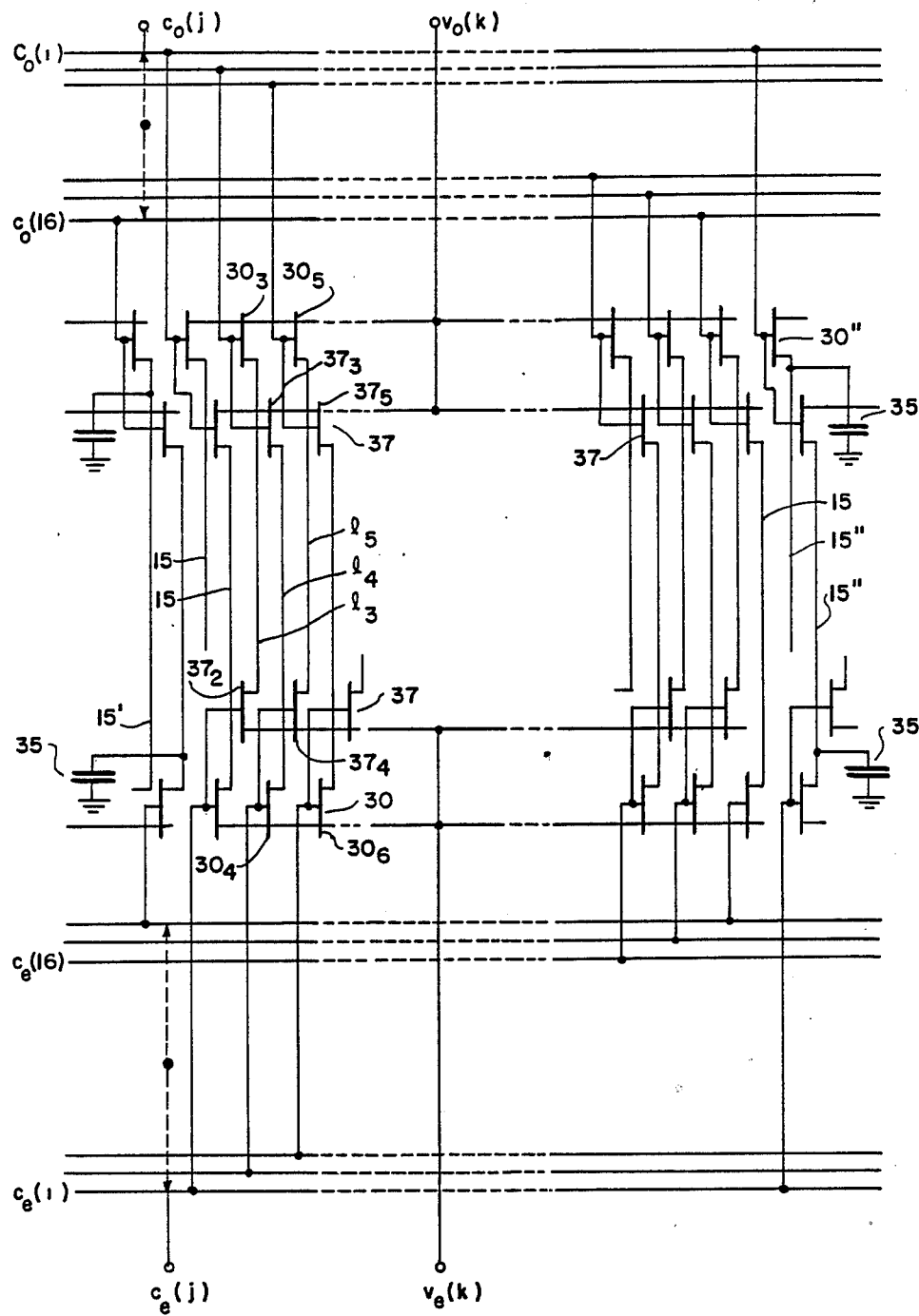
FIG. 5 is a schematic illustrating the addition of redundancy for the column lines in accordance with the invention.

The redundancy scheme of the invention is illustrated in FIG. 5 for only a few of the column lines, with the same reference numerals used as in FIG. 4 for corresponding elements. If one compares FIGS. 4 and 5, it will be evident that one additional transistor 37 per column line has been added. Now consider the lines labelled $l_3$ . . . $l_5$. Line $l_3$ is connected as before to the drain of the original or primary drive transistor $30_3$, whose gate is commonly connected with the gate of supplemental transistor $37_3$ whose drain is connected to column $l_4$, the next succeeding column line. Similarly, $l_4$ is driven at the bottom from primary transistor $30_4$, whose supplemental transistor $37_4$ drain is connected to line 5. When a selection control line C is turned ON, it turns ON not only the primary driver connected to a column line, but also the supplemental driver connected to the next higher-numbered column line. Thus, when a video signal is applied to V(k), two adjacent column lines contain the same signal. Moreover, each column line, except for the first in each section, is driven from opposite sides. Thus, if a line break occurs in an odd-numbered column line (except for the first in each section), video signals will be displayed on the line part above the break that will be correct, and the line part below the break will display the video signals of the previous adjacent column. If a break occurs in an even-numbered line, the line part below the break will display the correct video information and the part above the break the video information of the previous adjacent column. This slightly displaced information would be hardly noticeable to the user. If the redundancy scheme of FIG. 5 were not present, then no pixels could be activated below breaks in odd-numbered columns and above breaks in even-numbered columns. A missing line is a much more noticeable defect than a set of slightly displaced pixels. If no breaks are present, then each column but 1, 33, 65 first receives the video signal of the previous adjacent column and then, during the next part of the line scan, this wrong, but highly correlated information is overwritten by the right video signals, which is then stored for a frame time interval. My redundancy scheme thus protects 620 out of the 640 columns against line defects and driver transistor opens. For driver transistor shorts, suitable laser erasure of the shorted transistor would be necessary to convert the short to an open/break which is protected by my redundancy scheme. If this would not be done, a line-defect would be visible. My scheme does not protect against defects in the pixel transistors 11.

Figure 6A:
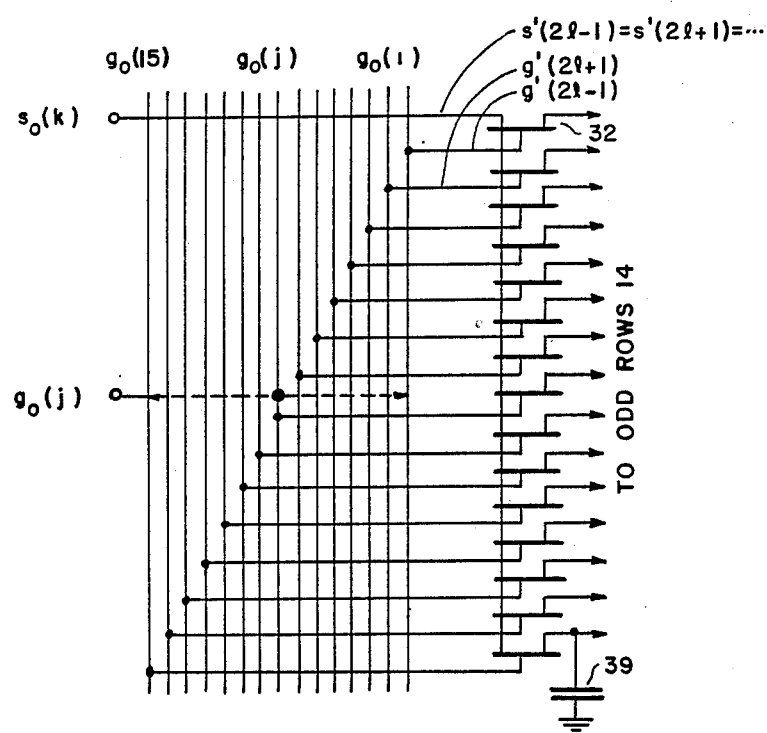
FIGS. 6(a) and 6(b) are schematics illustrating row addressing in accordance with the invention.
Figure 6B:
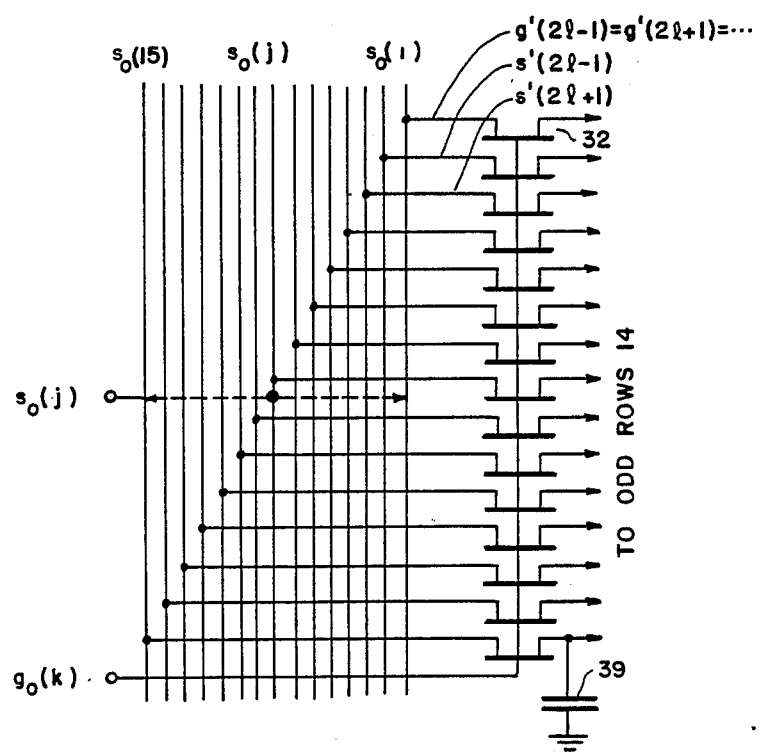

The row addressing scheme is in certain respects similar to that for the columns, and is illustrated in two versions in FIG. 6. The rows are divided up into 16 sections of 15 rows each, using the same matrix technique for the connections to the row driver transistors 32. The required storage capacitor for each row is schematically illustrated at 39 only for the lowest rows but are present at all the rows, i.e., each row would contain its own capacitance. One section of rows is illustrated, the other sections being similar. Corresponding drivers 32 in each section are connected to the vertically-shown row selection lines common to all sections. In the version depicted in FIG. 6(b), each row selector line s(j) is connected to the source of the transistor 32 whose drain is connected to one of the 15 row lines 14 in that section. All the gates of the transistors 32 in the same section are interconnected and pass to a terminal g(k). There are 16 terminals g(k), one for each section. The rows are consecutive in each section; thus section 1 will handle rows 1 ... 15, section 2 rows 16 ... 30, etc.

In the modified version depicted in FIG. 6(a), the same basic geometry exists, except now, the row selection lines g(1) ... g(15) are connected each to one gate of the drivers 32, and the same source electrodes of all the drivers 32 in each section are interconnected to a terminal s(k), where again k varies from 1 ... 16.

Figure 7:
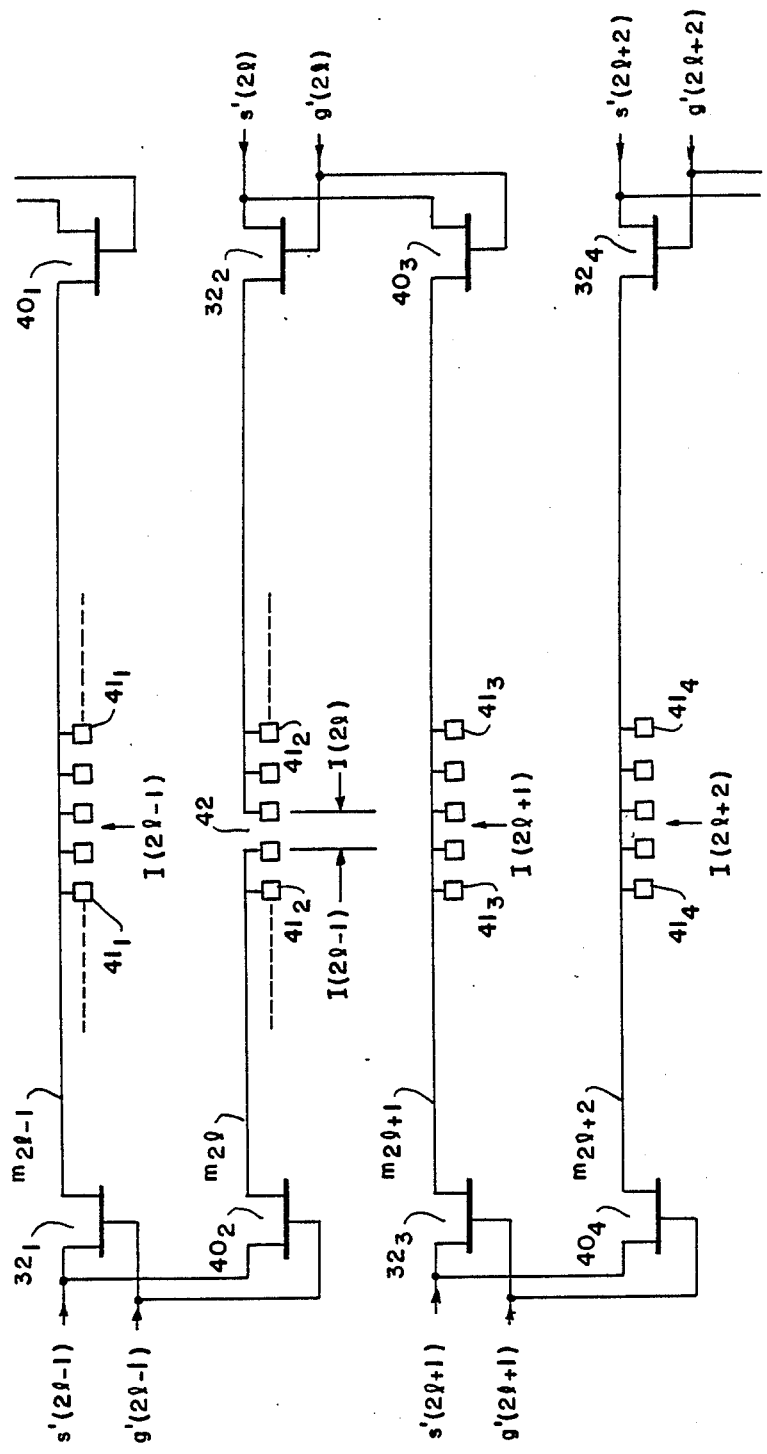
FIG. 7 is a schematic illustrating the addition of redundancy for the row lines in accordance with the invention.

Both versions allow incorporation of the same redundancy scheme used for the columns, illustrated schematically in FIG. 7 for four rows. The only requirement is that the control signals s and g for all driver TFTs are realized in such a way that any two driver TFTs connected to the same row are not activated (given a low impedance) simultaneously. The first row is $m_{2l-1}$, the second row $m_{2l}$, etc. The normal or primary row driver transistors are indicated by 32 and the supplemental transistors by 40. Note that the sources of the primary 32 and the supplemental 40 transistors are interconnected. The gates of the primary 32 and supplemental 40 transistors for each pair of rows are also interconnected, but the drains are connected to adjacent rows, each of which is thus fed from opposite sides. The active pixels, consisting of elements 11 and 12, are shown as rectangles 41 connected to each row. The column lines are not drawn.

Operation is as follows. Each row in turn is selected by applying an ON pulse to terminals $s'(2l-1)$ and $g'(2l-1)$, $s'(2l)$ and $g'(2l)$, etc., in sequence for, for example, the active line time TL. Alternatively, the pixel loading can occur during horizontal flyback time Tf. In either event, both the primary transistor $32_1$ is turned ON, and due to the parallel connections, supplemental transistor $40_2$ is also turned on. This means that the incoming video line is loaded into both the $M_{2l-1}$ and $M_{2l}$ pixels, $41_1$, $41_2$. During the second line time, $g'(2l-1)$ is turned OFF and $s'(2l)$ and $g'(2l)$ turned ON, turning on transistors $32_2$ and $40_3$. This loads the next incoming video line into the pixels $41_2$, $41_3$ of rows $m_{2l}$ and $m_{2l+1}$. In the absence of line breaks, this second loading into row $m_{2l}$ overwrites the previous (slightly incorrect) information so that line $m_{2l}$ now displays the correct video. Line $m_{2l+1}$ displays the line $m_{2l}$ video, until it in turn is overwritten during the third cycle, and so on. So the viewer sees essentially a correct display.

Redundancy for line breaks or driver transistor opens is achieved by the provision of the supplemental driver 40 for the next row, but receiving the source and gate signals for the previous row, thus addressing two adjacent lines at a time instead of only one. In case of a line break or open driver, illustrated in line $m_{2l}$ at 42, the pixels $41_2$ to the left of the break will contain the line $m_{2l-1}$ video, since, due to the break, they are not overwritten during the second cycle. The pixels $41_2$ to the right of the break will contain the correct video. Instead of no information at all in the pixels to the left of the break, they now contain the highly correlated information of the previous row. This artifact will be hardly noticeable to the viewer.

Maintaining the correct voltage or charge on the pixel is important for a satisfactory display. This depends on the presence of the proper "off-state" voltage on the unactivated rows. This, in turn, depends on the realization and maintenance of the proper "off-state" voltage on the capacitors 39 of the unactivated rows.

Figure 8:
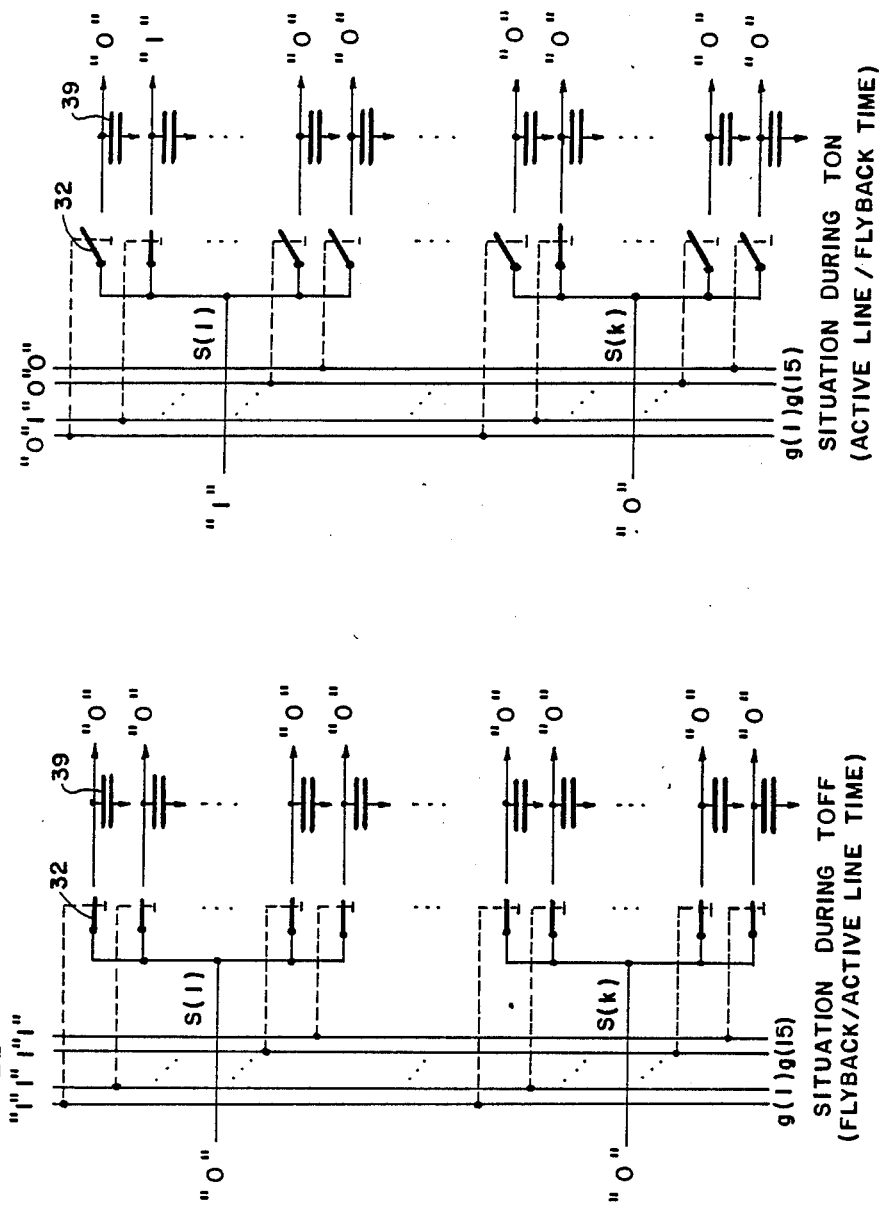
FIG. 8 is a schematic illustrating the row scanning in accordance with the invention.

One of the features of my invention is the provision of circuitry that redefines the OFF-state of all rows during the part of every TV line time that all rows are inactive. So, if the rows are selectively activated during horizontal flyback, the row capacitors are all reset to the OFF-state during the active line time. Alternatively, if the rows are selectively activated during the active line time, the row capacitors are all reset to the OFF-state during the flyback interval. This feature is illustrated in FIG. 8 where the TFTs are drawn as switches. This feature can be used alone, or in combination with the multiplexed driver scheme of FIGS. 2, 4 and 6, and/or in combination with the redundancy schemes illustrated in FIGS. 5 and 7. This resetting is achieved by a combinatorial logic circuit employing, in the preferred embodiment for the addressing matrix, signals correlated to the section selection, line selection, and horizontal flyback pulses. One example of a suitable logic circuit is depicted in FIG. 9. This circuit will provide by combinatorial logic the properly timed signals for row activation and OFF-restoration during, respectively, horizontal flyback and active video. The final voltage levels of both the ON-state and OFF-state are chosen such that the driver TFTs and/or the pixel TFTs are placed in a sampling mode (low ON-resistance) or in a hold mode (high ON-resistance), respectively.

Suppose that the row addressing circuitry is as depicted in FIG. 6(a) which is schematically shown in FIG. 8. In case of row activation during the horizontal flyback time we have to apply a short ON or "1" pulse (herein I will sometimes refer to the ON pulse or state as a "1", and an OFF pulse or state as a "0" as in conventional logic circuits) to the selected row, the length being approximately 6 $\mu$S, the flyback time in case of progressive scanning. For a full frame, a separated by 26 $\mu$S gaps are necessary. These 6 $\mu$S pulses are easily obtained from a 30 bit line clocked shift register of which the outputs are gated by the horizontal flyback pulses (h). I call for convenience such a sequence of "1s" a traveling "short 1". This traveling "short 1" can be obtained by gating the a(1) signals depicted in FIG. 10(b) with the flyback pulse h depicted in FIG. 10(c). The pulses are applied to each of the g(j) lines. During the horizontal flyback time, I simultaneously apply to each of the S(k) terminals a traveling "long 1" with an ON-time of 30×32 $\mu$s. This traveling "long 1" is depicted as C(m) in FIG. 10(a) (see also the top of FIG. 10(b)). As a result, each row is progressively selected during the horizontal flyback times by the combination of the "long" and "short" "1s". The result of turning ON transistors 32 is to charge up the associated capacitor 39 to a "1". The row line is activated when the capacitor charge is a "1". After the line scan is completed, and the video information transferred to the pixels in that row, the pixel TFTs are turned OFF, by inactivating the row for the remainder of the frame time. To ensure the latter, the capacitor 39 should be "discharged" or placed in the OFF or "0" state until the next activation cycle. To make sure that the OFF-state is not gradually lost, during each active horizontal video period all the rows are reset or restored to their OFF or "0" state. This is achieved by supplying a 26 μS "1" on all of the gate lines g(1) ... g(15), and placing a "0" for the same 26 μS time interval on all of the source lines S(1) ... S(16). This action clamps each row capacitor to the OFF-state during each active horizontal video interval, i.e., 480 times per frame, and during the next flyback time one of the 480 rows is selectively activated. The above described signals for g(j) and S(k) can be defined by the following Boolean equations:

$$g(j) = g(l) = (a(l) \wedge h) \vee \bar{h}, \text{ and } S(k) = S(m) = C(m) \wedge h.$$

Figure 10A:
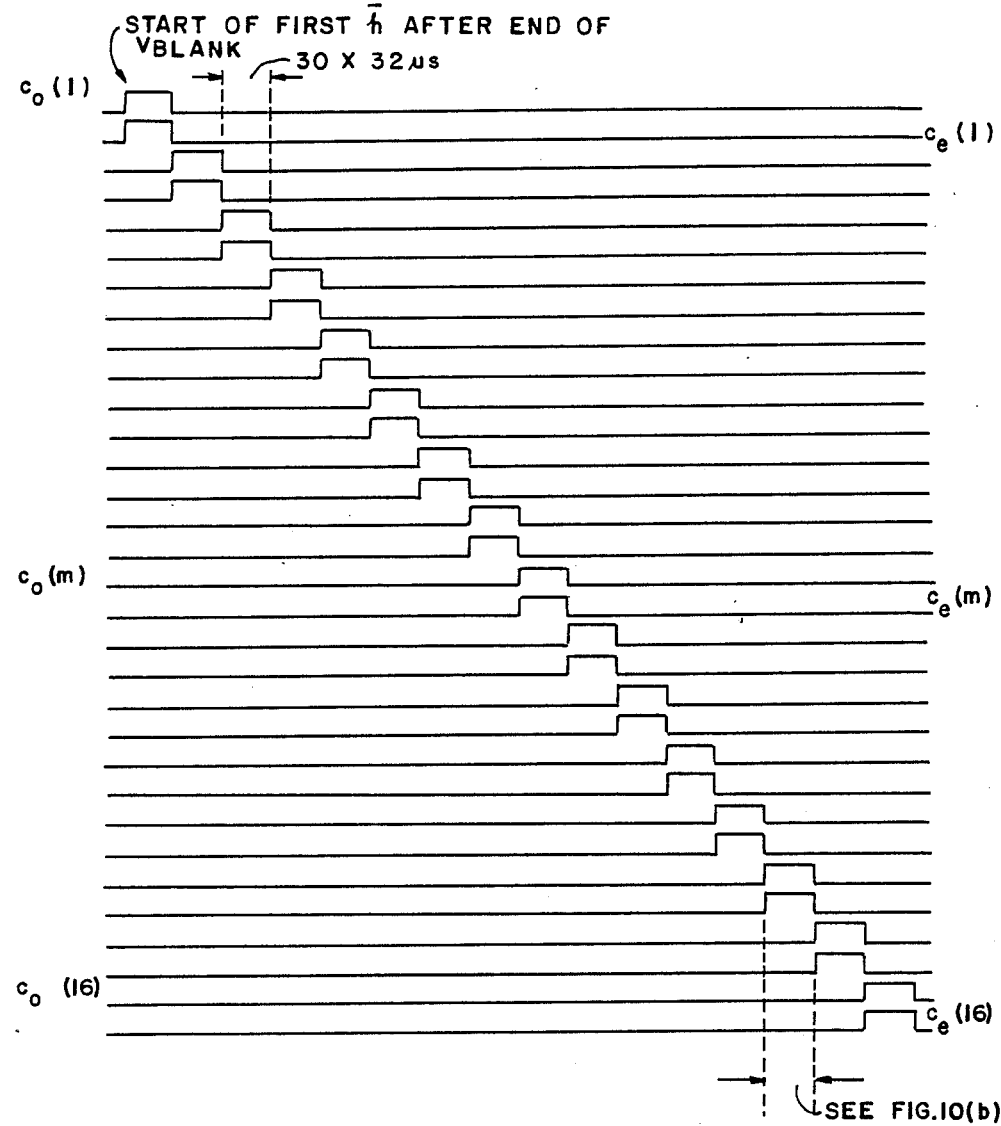
FIGS. 10(a), 10(b), 10(c) and 10(d) show waveforms of the type used or generated by the logic circuit of FIG. 9.
Figure 10B:
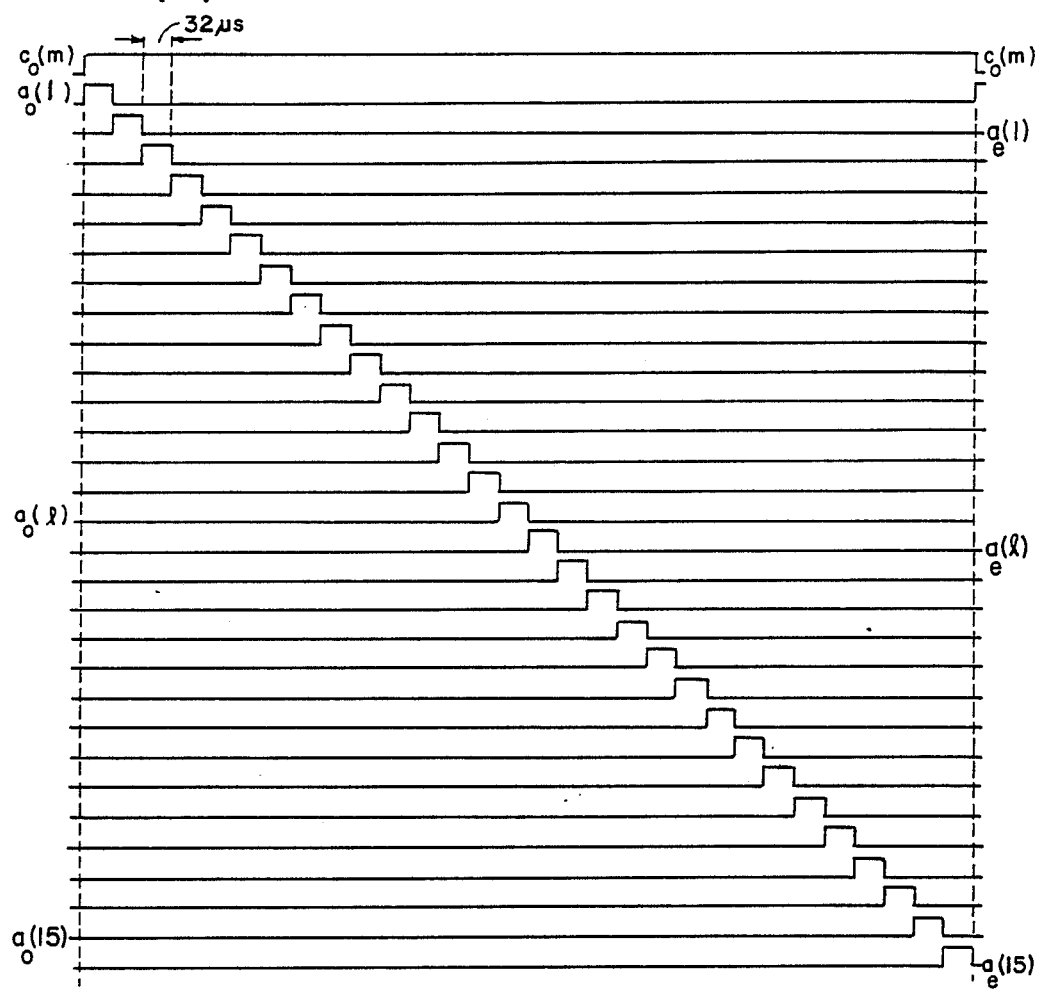
Figure 10C:
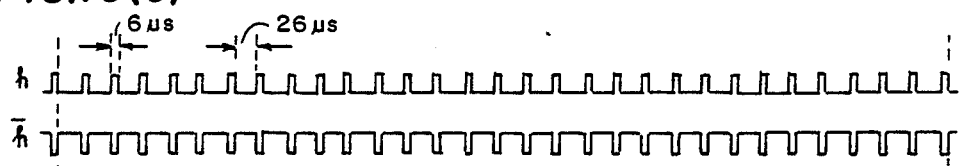
Figure 10D:
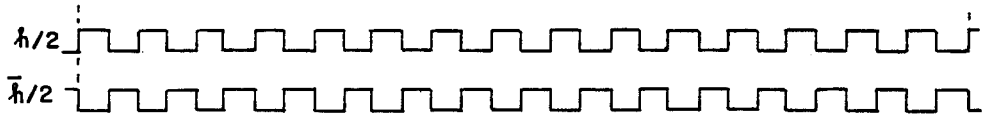

One way to realize the pulses is indicated in FIG. 9, which shows a conventional 16 bit shift register 60, activated by suitable data input 68 and clock 69, outputs a train of pulses in sequence from 16 outputs 70. FIG. 10(a) illustrates this train of $30 \times 32$ μs pulses. The data input at 68 is a "1" that starts at the first positive going transition of $\bar{h}$ after termination of the vertical blanking pulse, $V_{blank}$, and stops as soon as the first bit of the shift register 60 becomes "1" which resets flipflop 52 via the OR-gate 56. The clock input at 69 is h for the first of the 16 clocks, and at 73, it is the inverted 30th output 72 of shift register 54 that is cyclically clocked $16 \times 30$ times by $\bar{h}$. The clock-selection is realized with an OR-gate 57 and an AND-gate 59. The outputs 70 of shift register 60 are gated by the h' pulse at 71 using AND-gates 63. The h' pulse is equal to the h pulse in case of negligible rise and fall times of the components. Otherwise, h' should start somewhat later than h and it should stop somewhat earlier. The resulting signals 74 from AND-gates 63 are given by $s(m) = c(m) \cdot h$. If necessary, these signals are given the appropriate levels using the level converter 65. The output signals at 75 are $S_o(1), S_e(1), \ldots S_o(16), S_e(16)$. Another conventional 30 bit shift register 54 activated by a suitable data input at 76 and clock at 77 outputs a train of pulses in sequence from 30 outputs 78. FIG. 10(b) illustrated this train of 32 μs pulses. The data input is a "1" that starts at the first positive-going transition of $\bar{h}$ after termination of $V_{blank}$ or, using OR-gate 53, at each positive-going transition of the 30th bit of shift register 54, and stops as soon as the first bit of shift register 54 becomes "1" which resets flipflop 51 via the OR-gate 55. The clock input 77 is always the $\bar{h}$ pulse. The outputs 78 of shift register 54 are gated with the h pulse using an AND gate 61. The resulting signals 79 are inputted with $\bar{h}$ at the OR-gates 62. The resulting signals at 80 are given by $g(l) = (a(l) \wedge h) \vee \bar{h}$. If necessary, these signals are given the appropriate levels using the level converter 64. The output signals at 81 are $g_o(1), g_e(1), \ldots g_o(15), g_e(15)$. The signal at 82 that marks the first positive-going transition of $\bar{h}$ after termination of $V_{blank}$ is realized with a flipflop 50 with $V_{blank}$ as the data input and $\bar{h}$ as the clock input. Flipflops 51, 52 and shift registers 54, 60 are reset for every field using $V_{blank}$. The input signals to this circuitry are $V_{blank}$ and $\bar{h}$. Using inverters 66 and 67, $V_{blank}$ and h are realized.

The signals needed to generate g(1) and S(m) are indicated generally in FIG. 10. In FIG. 10(a) is depicted a long travelling "1" corresponding to C(m) pulses. FIG. 10(b) depicts the a(l) pulses. The pulses $C_o(m)$ and $a_o(l)$ on the left of FIGS. 10(a, b) are used to realize the driving signals for the left side of the active matrix (FIG. 2) to activate and restore the odd row lines, and the pulses $C_e(m)$ and $a_e(l)$ on the right of FIGS. 10(a, b) are used to realize the driving signals for the right side of the active matrix to activate and restore the even row lines. FIG. 10(c) shows the flyback pulses h. As indicated, $\bar{h}$ is just the inverse of h. As further indicated, with this application of pulses as indicated in FIGS. 9 and 10 to the circuit of FIG. 6(a), during each active video time interval, a "0" is applied to all the row lines 14, charging the voltage on the row capacitors 39 to the proper OFF-state value. Thus, in accordance with this feature of the invention, the OFF-state of all rows is defined during each active video line time and subsequently stored on the row line capacitors 39.

For the FIG. 6(b) arrangement, a different arrangement of pulses would be necessary, defined by the Boolean equations $S(j) = S(l) = (a(l) \wedge h) \wedge h = a(l) \wedge h$, and $g(k) = g(m) = C(m) \vee \bar{h}$. Similarly, if one chooses to activate the row lines during active video, and restore the OFF-state of the row lines during horizontal flyback, then the corresponding Boolean equations for FIG. 6(a) are: $g(j) = g(l) = (a(l) \wedge \bar{h}) \vee h$ and $S(k) = S(m) = C(m) \wedge \bar{h}$. In this mode, for FIG. 6(b), the Boolean equations are: $g(k) = g(m) = C(m) \vee h$ and $S(j) = S(l) = (a(l) \wedge \bar{h}) \wedge \bar{h} = a(l) \wedge \bar{h}$. For the FIG. 6(a) arrangement, my novel redundancy scheme can be used with the above-described signals S(k) and g(j). For the FIG. 6(b) arrangement, the $g_o(k)$ signals for the odd-numbered rows have to be gated with the (h/2) signal that is "1" for odd-numbered rows only, and the $g_e(k)$ signals for the even-numbered rows have to be gated with the $(\overline{h/2})$ signal that is "1" for the even-numbered rows (see FIG. 10(d)). It will be evident to those skilled in this art from the example given in FIG. 9 how to rearrange the AND and OR gates depicted to obtain the necessary signals indicated by the above Boolean equations.

It will be clear from the foregoing description that I have provided an active matrix display especially suited for TV using, basically, only one TFT as the column or row driver providing a low number of connections to the active matrix. The driver matrix disclosed lends itself to fabrication at the same time that the active matrix is fabricated, thus increasing the integration on the substrate and reducing the need for external ICs. Even the logic circuitry depicted in FIG. 9 is easily integrated using the same thin film TFT technology. That is to say, one bit of the shift register can be created with a minimum of 4 TFTs, and the AND and OR gates with 4 TFTs each; thus a minimum total of only $30 \times (4+4+4) + 16(4+4) = 488$ additional TFTs, which is very small considering the over 300,000 TFTs needed for the active matrix. The redundancy scheme described requires at most one additional TFT for each row and nearly all the columns. The circuitry described can be used to activate the rows during active line time or during flyback time, depending upon local fabrication constraints, i.e. the ability of the available technology to make the TFTs that will exhibit the current needed for the mode chosen. Thus, the different aspects of the invention and the different modes of operation possible extends the flexibility of my system and makes it suitable for a wide range of operating conditions.

While the invention has been described in connection with specific examples and embodiments, it will be understood it is not limited thereto, and all variations and modifications evident to those skilled in the art based upon the principles disclosed herein are deemed to be included within the scope of the appended claims.

I claim:

1. A matrix display device comprising a plurality of display elements arranged in an array of row and column conductors, each of which display elements comprises opposed electrodes with electro-optical material therebetween and is associated with switching means operable to control the application of data signals to the display element via the column conductors in response to switching signals being applied thereto via the row conductors and with addressing circuitry being provided to apply the data signals and the switching signals to their respective column and row conductors, characterized in that the addressing circuits for at least one of the row and column conductors includes one primary transistor connected to one end of the even-numbered conductors and one primary transistor connected to the opposite end of the odd-numbered conductors, and means connected to each of the primary transistors for simultaneously supplying the same signals to the next adjacent conductor.

2. A matrix display device according to claim 1, characterized in that the simultaneous supplying means comprises one supplemental transistor associated with substantially each primary transistor.

3. A matrix display device according to claim 2, characterized in that the primary and supplemental transistors have source, drain and gate electrodes, the drain of each primary transistor is connected to a conductor and the drain of each supplemental transistor associated with each primary transistor is connected to the next adjacent conductor, means interconnecting the sources of the primary and their associated supplemental transistors, and means interconnecting the gates of the primary and their associated supplemental transistors.

4. A matrix display device according to claim 1 further characterized in that the addressing circuitry for at least one sub-set of row and column conductors comprises an addressing matrix having first and second line sets and a plurality of driver transistors each having source, drain, and gate electrodes connected such that the drains are each respectively connected to one of the conductors, the gates are correspondingly connected to lines in the first line set and the sources are commonly connected to one line in the second line set, and in that the switching signals are coupled to one line set of the first and second line sets and the data signals are coupled to the line set of said first and second line sets other than the one line set.

5. A matrix display device according to claim 4 further characterized in that the switching signals comprise an ON state to activate a row conductor and on OFF state when the row conductor is deactivated, the data signals extend over an active line time and are followed by a shorter flyback or line-blank time, means for providing ON pulses sequentially to the row conductors during one of the active line times or during one of the line-blank times, and means for positively defining the OFF state for all the row conductors simultaneously during the line-blank times in case of row activation during active line time, or during the active line times in case of row activation during line-blank time.

6. A matrix display device according to claim 1 further characterized in that the switching signals comprise an ON state to activate a row conductor and on OFF state when the row conductor is deactivated, the data signals extend over an active line time and are followed by a shorter flyback or line-blank time, means for providing ON pulses sequentially to the row conductors during one of the active line times or during one of the line-blank times, and means for positively defining the OFF state for all the row conductors simultaneously during the line-blank times in case of row activation during active line time, or during the active line times in case of row activation during line-blank time.

7. A matrix display device comprising a plurality of display elements arranged in an array of row and column conductors, each of which display elements comprises opposed electrodes with electro-optical material therebetween and is associated with switching means operable to control the application of data signals to the display element via the column conductors in response to switching signals being applied thereto via row conductors and with addressing circuitry being provided to apply the data signals and the switching signals to their respective column and row conductors, characterized in that the addressing circuitry for at least one sub-set of row and column conductors comprises an addressing matrix having first and second line sets and a plurality of driver transistors each having source, drain and gate electrodes connected such that the drains are each respectively connected to one of the conductors, the gates are correspondingly connected to lines in the first line set and the sources are commonly connected to one line in the second line set, in that the switching signals are coupled to one line set of the first and second line sets and the data signals are coupled to a line set of said first and second line sets other than the one, and in that the switching signals comprise an ON state to activate a row conductor and an OFF state when the row conductor is deactivated, the data signals extend over an active line time and are followed by a shorter flyback or line-blank time, means for providing ON pulses sequentially to the row conductors during one of the active line times or during one of the line-blank times, means for positively defining the OFF state for all the row conductors simultaneously during the line-blank times in case of row activation during active line time, or during the active line times in case of row activation during line-blank time.

8. A matrix display device according to claim 7, characterized in that the array contains m row conductors and n column conductors that are each driven with one driver transistor per row and one driver transistor per column and said addressing matrix contains k rows and L columns with $k+L$ substantially at a minimum value, said minimum value being $2\sqrt{m}$ for one-sided addressing of odd and even row conductors, $2\sqrt{m/2}$ for two-sided addressing of odd and even row conductors, $2\sqrt{n}$ for one-sided addressing of odd and even column conductors, or $2\sqrt{n/2}$ for two-sided addressing of odd and even column conductors.

9. A matrix display device according to claim 8, characterized in that means are provided to supply to the addressing matrices $k+L$ input signals, and the addressing matrices are uniformly distributed around the periphery of the display array such as to minimize the number of connections per millimeter to the substrate.

10. A matrix display device according to claim 7, characterized in that the addressing matrices are integrated on the same substrate as the display elements.

11. A matrix display device according to claim 10, characterized in that the switching means and driver transistors are TFTs having the same general composition.

12. A matrix display device comprising a plurality of display elements arranged in an array of row and column conductors, each of which display elements comprises opposed electrodes with electro-optical material therebetween and is associated with switching means operable to control the application of data signals to the display element via the column conductors in response to switching signals being applied thereto via the row conductors and with addressing circuitry being provided to apply the data signals and the switching signals to their respective column and row conductors, characterized in that the switching signals comprise an ON state to activate a row conductor and an OFF state when the row conductor is deactivated, the data signals extend over an active line time and are followed by a shorter flyback or line-blank time, means are provided to apply ON pulses sequentially to the row conductors during one of the active line times or during one of the line-blank times, and means are provided to positively define the OFF state for all the row conductors simultaneously during the line-blank times in case of row activation during active line time, or during the active line times in case of row activation during line-blank time.

13. A matrix display device according to claim 12, characterized in that the OFF state is positively defined by applying an OFF pulse to all row conductors simultaneously during the active line time, or during the line-blank time.

14. A matrix display device according to claims 12 or 13, characterized in that the means to apply ON pulses and the means to positively define the OFF state are formed by thin-film technology in the same manner as the display elements.

15. A matrix display device according to claim 13 wherein the row addressing circuitry is in the form of a row and column matrix.

16. A matrix display device according to claim 15, characterized in that the array contains m row conductors and n column conductors that are each driven with one driver transistor per row and one driver transistor per column and said addressing matrix contains k rows and L columns with $k+L$ substantially at a minimum said minimum value being $2\sqrt{m}$ for one-sided addressing of odd and even row conductors, $2\sqrt{m/2}$ for two-sided addressing of odd and even row conductors, $2\sqrt{n}$ for one-sided addressing of odd and even column conductors, or $2\sqrt{n/2}$ for two-sided addressing of odd and even column conductors, and a combinational logic circuit for generating trains of pulses which when applied to rows of the addressing matrix activates each row conductor in turn whil positively defining the OFF state of all row conductors when not activated.

17. A matrix display device according to claim 16 for displaying a TV image wherein the combinational logic circuit uses as inputs signals related to or derived from the horizontal or vertical flyback pulse.

18. A matrix display device for displaying a TV image according to claim 17, characterized in that the TV signal comprises an active line time followed by a flyback or line-blank time, and the combinational logic circuit generates outputs to activate each row conductor during the active line time and to restore all row conductors to the OFF state during flyback time.

19. A matrix display device for displaying a TV image according to claim 17, characterized in that the TV signal comprises an active line time followed by a flyback or line-blank time, and the combinational logic circuit generates outputs to activate each row conductor during the line-blank or flyback time and to restore all row conductors to the OFF state during the active line time.

* * * * *